(12) United States Patent
Wan et al.

(10) Patent No.: US 12,509,362 B2
(45) Date of Patent: Dec. 30, 2025

(54) CARBONATE PRECURSOR HAVING HIGH-NICKEL AND LOW-COBALT SANDWICH STRUCTURE, PREPARATION METHOD THEREFOR AND APPLICATION THEREOF

(71) Applicant: SVolt Energy Technology Company Limited, Changzhou (CN)

(72) Inventors: Jiangtao Wan, Changzhou (CN); Haipeng Ren, Changzhou (CN); Yongjie Zhang, Changzhou (CN); Ning Zhang, Changzhou (CN); Weijun Jiang, Changzhou (CN); Qiqi Qiao, Changzhou (CN); Zitan Li, Changzhou (CN); Zhonglong Ma, Changzhou (CN)

(73) Assignee: SVolt Energy Technology Company Limited, Changzhou (CN)

( * ) Notice: Subject to any disclaimer, the term of this patent is extended or adjusted under 35 U.S.C. 154(b) by 762 days.

(21) Appl. No.: 17/780,958

(22) PCT Filed: Oct. 26, 2020

(86) PCT No.: PCT/CN2020/123534
§ 371 (c)(1),
(2) Date: May 27, 2022

(87) PCT Pub. No.: WO2021/103879
PCT Pub. Date: Jun. 3, 2021

(65) Prior Publication Data
US 2023/0002241 A1    Jan. 5, 2023

(30) Foreign Application Priority Data

Nov. 29, 2019   (CN) .......................... 201911203407.3

(51) Int. Cl.
*H01M 10/052* (2010.01)
*C01G 53/82* (2025.01)

(52) U.S. Cl.
CPC .......... *C01G 53/82* (2025.01); *H01M 10/052* (2013.01); *C01P 2004/61* (2013.01); *C01P 2006/40* (2013.01); *H01M 2220/20* (2013.01)

(58) Field of Classification Search
CPC ..... H01M 10/052; H01M 10/055; H01M 4/36
See application file for complete search history.

(56) References Cited

FOREIGN PATENT DOCUMENTS

| CN | 103367704 A | 10/2013 |
| CN | 104409716 A | 3/2015 |

(Continued)

OTHER PUBLICATIONS

Machine Translation of: Tan et al. (CN 107968198A), Jul. 17, 2020.*
Machine Translation of: Han et al. (CN 104409716A), Mar. 11, 2015.*
Machine Translation of: Chen et al. (CN 109671947A), Apr. 23, 2019.*

(Continued)

*Primary Examiner* — Kenneth J Douyette
(74) *Attorney, Agent, or Firm* — Randy J. Pritzker

(57) ABSTRACT

A carbonate precursor that has a high-nickel and low-cobalt sandwich structure, a preparation method therefor and an application thereof. The precursor includes an inner core and an outer shell layer, wherein the outer shell layer covers at least a part of the outer surface of the inner core. The carbonate precursor having the sandwich structure has the advantages of narrow particle size distribution, good fluidity, and an excellent electrochemical performance, and may be stably produced in both an ammonia-free system and an ammonia-containing system.

12 Claims, 2 Drawing Sheets

(56) References Cited

FOREIGN PATENT DOCUMENTS

| | | |
|---|---|---|
| CN | 104716315 A | 6/2015 |
| CN | 104966820 A | 10/2015 |
| CN | 105609758 A | 5/2016 |
| CN | 106340638 A | 1/2017 |
| CN | 107834041 A | 3/2018 |
| CN | 107968198 A | 4/2018 |
| CN | 106564967 B | 6/2018 |
| CN | 105977462 B | 8/2018 |
| CN | 106340638 B | 3/2019 |
| CN | 109671947 A | 4/2019 |
| CN | 109686967 A | 4/2019 |
| CN | 110023246 A | 7/2019 |
| CN | 110233257 B | 1/2020 |
| CN | 111422917 A | 7/2020 |
| KR | 20190078498 A | 7/2019 |
| WO | WO 2016060310 A1 | 4/2016 |

OTHER PUBLICATIONS

International Search Report dated Jan. 29, 2021, in connection with International Application No. PCT/CN2020/123534.

Chinese Office Action dated Oct. 11, 2021, in connection with Chinese Application No. 201911203407.3.

[No Author Listed], Ternary Materials for Lithium-Ion Batteries, Technology and Production Application, May 31, 2015, p. 176, 3 pages.

Extended European Search Report dated Sep. 22, 2023, in connection with European Application No. 20891936.5.

Ma et al. Comparative study of simple and concentration gradient shell coatings with $Li1.2Ni0.13Mn0.54Co0.13O_2$ on $LiNi0.8Mn0.1Co0.1O_2$ cathodes for lithium-ion. Solid State Ionics. Jul. 18, 2019. 341(115034). 10 Pages.

\* cited by examiner

CARBONATE PRECURSOR HAVING HIGH-NICKEL AND LOW-COBALT SANDWICH STRUCTURE, PREPARATION METHOD THEREFOR AND APPLICATION THEREOF

CROSS-REFERENCES TO RELATED APPLICATIONS

This is a National Stage Application, filed under 35 U.S.C. 371, of International Patent Application No. PCT/CN2020/123534, filed on Oct. 26, 2020, which is based on and claims priority to Chinese Patent Application No. 201911203407.3 filed with the China National Intellectual Property Administration (CNIPA) on Nov. 29, 2019, the disclosure of which is incorporated herein by reference in its entirety.

TECHNICAL FIELD

The present disclosure relates to the technical field of lithium batteries, for example, to a carbonate precursor having a high-nickel and low-cobalt sandwich structure, a preparation method therefor and an application thereof.

BACKGROUND

With the development of technology, although lithium cobalt oxide batteries are easy to synthesize and have stable performance, the commercial times of lithium cobalt oxide batteries no longer exist because of the high price of cobalt and the lack of cobalt resources, and low-cobalt and cobalt-free cathode materials will become a development direction in the future. In recent years, lithium-ion battery ternary materials have developed rapidly, and the development of high-quality high-nickel and low-cobalt ternary precursors and cathode materials has become a hot spot. In the market, hydroxide precursors are generally used as raw materials and sintered into cathode materials while the research on carbonate ternary precursors and their cathode materials is relatively few. At present, the reported carbonate precursors have the problems of insufficient particle uniformity, uneven particle size distribution, and poor fluidity, which causes the failure of continuous production of carbonate precursors. However, in most of the existing processes, ammonium bicarbonate is used as a precipitant to synthesize the carbonate precursor. This scheme is feasible for common ternary precursors and cathode material systems, but it often fails to achieve good results for high-nickel products, the morphology, particle size, and particle size distribution cannot be well controlled, and there are environmental protection problems related to ammonia-containing wastewater treatment.

At the same time, for cathode materials, high-temperature calcination and oxidation in the process of preparing high-nickel ternary cathode materials are usually prone to cause the mixing of part of Ni divalent metal ions and lithium ions, which easily causes local structure collapse and instability during the cycle, resulting in the decrease of specific capacity and poor circulation of the final materials. In general, 750° C. and a pure oxygen atmosphere can enable the high-nickel materials to be completely transformed and crystallized, but the excessive temperature will aggravate cation mixing.

Therefore, how to reduce the calcination temperature of carbonate precursor materials, especially large grained materials, is a direction to improve the properties of materials.

SUMMARY

The present disclosure provides a carbonate precursor having a high-nickel and low-cobalt sandwich structure, a preparation method therefor and an application thereof.

The present disclosure provides a carbonate precursor having a high-nickel and low-cobalt sandwich structure in an embodiment. The carbonate precursor includes an inner core and outer shell layer. The chemical formula of the material of the inner core is $Ni_{x1}Co_{y1}Mn_{(1-x1-y1)}CO_3$, where x1 ranges from 0.75 to 0.92, such as 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, etc., and y1 ranges from 0.01 to 0.15, such as 0.01, 0.02, 0.03, 0.04, 0.05, 0.06, 0.07, 0.08, 0.09, 0.1, 0.11, 0.12, 0.13, 0.14, 0.15, etc.

The outer shell layer covers at least a part of the outer surface of the inner core, and the chemical formula of the material of the outer shell layer is $Ni_{x2}Co_{y2}Mn_{(1-x2-y2)}CO_3$, where x2 ranges from 0.7 to 0.92, such as 0.7, 0.72, 0.74, 0.76, 0.78, 0.80, 0.82, 0.84, 0.86, 0.88, 0.90, 0.92, etc., and y2 ranges from 0.01 to 0.15, such as 0.01, 0.02, 0.03, 0.04, 0.05, 0.06, 0.07, 0.08, 0.09, 0.1, 0.11, 0.12, 0.13, 0.14, 0.15, etc.

In an embodiment provided by the present disclosure, the carbonate precursor having a high-nickel and low-cobalt sandwich structure has the advantages of narrow particle size distribution, good fluidity, and excellent electrochemical performance, and may be stably produced in both an ammonia-free system and an ammonia-containing system, especially in the ammonia-free system, that is, no ammonia-containing wastewater is produced, which is environmentally friendly. Compared with a precursor material having a solid structure, when the precursor material having a sandwich structure is sintered with lithium ions, since the outer shell layer is thin, lithium ions can more easily penetrate through the shell into the sandwich and then reach the inner core, which makes the sintering of lithium ions easier, and the same sintering effect can be achieved even if the sintering temperature is appropriately reduced. That is, the precursor having a sandwich structure can achieve the complete transformation and crystallization of the high-nickel material at a relatively low temperature, which avoids the problem that the local structure of the high-nickel material collapses in the cycle process due to the mixing of cations in the high-temperature calcination process, and the residual alkali(s) becomes less, so that the prepared cathode material has a relatively high specific capacity and excellent cycle performance and electrochemical performance. The outer shell layer has a composition with a slightly low nickel content because such a low-nickel material is more stable and less likely to react with an electrolyte and affect the battery performance. The nickel content of the inner core is slightly higher because the outer surface of the inner core is covered with the outer shell layer and thus cannot be in contact with the electrolyte.

The "sandwich structure" described in an embodiment of the present disclosure refers to a cavity structure existing between the inner core and the outer shell layer covering the outer surface of the inner core. Lithium ions penetrate into the cavity from the outer shell layer and continue to penetrate into the inner core from the cavity.

In an embodiment, the precursor has a particle size of 8 μm to 15 μm, such as 8 μm, 9 μm, 10 μm, 11 μm, 12 μm, 13 μm, 14 μm, 15 μm, etc.

The particle size in an embodiment provided by the present disclosure refers to the average particle size.

In an embodiment provided by the present disclosure, due to the existence of the sandwich structure, the particle size cannot be guaranteed to be below 8 μm, and if the particle size exceeds 15 μm, the permeability effect of the sandwich may become weak or the particles are fragile because the sandwich is too thick, which degrades the quality of the precursor.

The present disclosure provides a method for preparing the preceding precursor in an embodiment. The method includes the following steps:
(1) mixing a soluble nickel salt, a soluble cobalt salt, and a soluble manganese salt according to a first ratio to obtain a first mixed salt;
(2) mixing a soluble nickel salt, a soluble cobalt salt, and a soluble manganese salt according to a second ratio to obtain a second mixed salt;
(3) with stirring, mixing the first mixed salt and a precipitant and subjecting them to a first coprecipitation reaction to obtain a first reacted liquid;
(4) with stirring, mixing the first reacted liquid and the second mixed salt and subjecting them to a second coprecipitation reaction to obtain a second reacted material;
(5) with stirring, mixing the second reacted material and a detergent to obtain a primary washed material;
(6) subjecting the primary washed material to a primary dehydration to obtain a primary dehydrated material;
(7) with stirring, subjecting the primary dehydrated material to a second washing and then dehydration to obtain a secondary dehydrated material; and
(8) drying the secondary dehydrated material and sieving the same to remove iron to obtain a carbonate precursor having a high-nickel and low-cobalt sandwich structure.

In an embodiment provided by the present disclosure, the inner core structure is obtained after the first mixed salt obtained by mixing a soluble nickel salt, a soluble cobalt salt, and a soluble manganese salt according to the first ratio and a precipitant are subjected to a coprecipitation reaction, the inner core structure is covered by an outer shell after the second mixed salt obtained by mixing a soluble nickel salt, a soluble cobalt salt, and a soluble manganese salt according to the second ratio and the obtained first reacted liquid are mixed and subjected to a coprecipitation reaction, and finally, after subsequent washing, dehydration, drying, sieving, and iron removal processes, the carbonate precursor having a sandwich structure can be prepared, which has advantages of narrow particle size distribution, good fluidity, and excellent electrochemical performance. The carbonate precursor can be produced stably in both an ammonia-free system and an ammonia-containing system, especially in the ammonia-free system, that is, no ammonia-containing wastewater is produced, which is environmentally friendly. The precursor having such a structure can achieve the complete transformation and crystallization of the high-nickel material at a relatively low temperature, which avoids the problem that the local structure of the high-nickel material collapses in the cycle process due to the mixing of cations in the high-temperature calcination process, so that the prepared cathode material has a relatively high specific capacity and excellent cycle performance and electrochemical performance.

In an embodiment, in step (1), the first ratio is a molar ratio of nickel, cobalt to manganese of (0.75 to 0.92):(0.01 to 0.15):(0.07 to 0.24), such as 0.75:0.15:0.1, 0.80:0.13: 0.07, 0.85:0.05:0.1, 0.9:0.03:0.07, 0.92:0.01:0.07, 0.75: 0.01:0.24, etc.

In an embodiment, in step (1), the concentrations of the soluble nickel salt, the soluble cobalt salt, and the soluble manganese salt in the first mixed salt are each independently 80 g/L to 130 g/L, such as 80 g/L, 85 g/L, 90 g/L, 95 g/L, 100 g/L, 105 g/L, 110 g/L, 115 g/L, 120 g/L, 125 g/L, 130 g/L, etc.

In an embodiment, in step (2), the second ratio is a molar ratio of nickel, cobalt to manganese of (0.7 to 0.92):(0.01 to 0.15):(0.07 to 0.29), such as 0.7:0.01:0.29, 0.80:0.13:0.07, 0.85:0.05:0.1, 0.9:0.03:0.07, 0.92:0.01:0.07, etc.

In an embodiment, in step (2), the concentrations of the soluble nickel salt, the soluble cobalt salt, and the soluble manganese salt in the second mixed salt are each independently 80 g/L to 130 g/L, such as 80 g/L, 85 g/L, 90 g/L, 95 g/L, 100 g/L, 105 g/L, 110 g/L, 115 g/L, 120 g/L, 125 g/L, 130 g/L, etc.

In an embodiment, in steps (1) and (2), the soluble nickel salt is independently selected from at least one of nickel chloride, nickel nitrate, and nickel sulfate.

In an embodiment, in steps (1) and (2), the soluble cobalt salt is independently selected from at least one of cobalt chloride, cobalt nitrate, and cobalt sulfate.

In an embodiment, in steps (1) and (2), the soluble manganese salt is independently selected from at least one of manganese chloride, manganese nitrate, and manganese sulfate.

In an embodiment, in step (3), the precipitant is selected from at least one of sodium carbonate, sodium bicarbonate, ammonium carbonate, and ammonium bicarbonate.

In an embodiment, the precipitant further includes ammonia water.

In an embodiment, the concentration of sodium carbonate is 100 g/L to 200 g/L, such as 100 g/L, 110 g/L, 120 g/L, 130 g/L, 140 g/L, 150 g/L, 160 g/L, 170 g/L, 180 g/L, 190 g/L, 200 g/L, etc.

In an embodiment, the concentration of sodium bicarbonate is 50 g/L to 100 g/L, such as 50 g/L, 55 g/L, 60 g/L, 65 g/L, 70 g/L, 75 g/L, 80 g/L, 85 g/L, 90 g/L, 95 g/L, 100 g/L, etc.

In an embodiment, the concentration of ammonium carbonate is 200 g/L to 500 g/L, such as 200 g/L, 250 g/L, 300 g/L, 350 g/L, 400 g/L, 450 g/L, 500 g/L, etc.

In an embodiment, the concentration of ammonium bicarbonate is 100 g/L to 200 g/L, such as 100 g/L, 110 g/L, 120 g/L, 130 g/L, 140 g/L, 150 g/L, 160 g/L, 170 g/L, 180 g/L, 190 g/L, 200 g/L, etc.

In an embodiment, the concentration of ammonia water is 100 g/L to 200 g/L, such as 100 g/L, 110 g/L, 120 g/L, 130 g/L, 140 g/L, 150 g/L, 160 g/L, 170 g/L, 180 g/L, 190 g/L, 200 g/L, etc.

In an embodiment, the stirring in the process of the first coprecipitation reaction is performed at a rotational speed of 700 rpm to 1000 rpm, such as 700 rpm, 750 rpm, 800 rpm, 850 rpm, 900 rpm, 950 rpm, 1000 rpm, etc., and a temperature of 50° C. to 70° C., such as 50° C., 52° C., 54° C., 56° C., 58° C., 60° C., 62° C., 64° C., 68° C., 70° C., etc., for 5 hours to 60 hours, such as 5 hours, 10 hours, 15 hours, 20 hours, 25 hours, 30 hours, 35 hours, 40 hours, 45 hours, 50 hours, 55 hours, 60 hours, etc.; the pH of the first reacted liquid is 8.5 to 9.5, such as 8.5, 8.6, 8.7, 8.8, 8.9, 9.0, 9.1, 9.2, 9.3, 9.4, 9.5, etc.; and the liquid-solid content of the first reacted liquid is 100 g/L to 300 g/L, such as 100 g/L, 120 g/L, 140 g/L, 160 g/L, 180 g/L, 200 g/L, 220 g/L, 240 g/L, 260 g/L, 280 g/L, 300 g/L.

In an embodiment provided by the present disclosure, because the precursor having a sandwich structure needs to be obtained later, the inner core formed by the first coprecipitation reaction needs to have an irregular structure to form supporting points for the subsequent formation of the sandwich structure. In this step, a relatively high stirring rotational speed is adopted so that the inner core having an irregular structure can be formed in the first coprecipitation reaction to provide supporting points for the subsequent formation of the sandwich structure.

In an embodiment, in step (4), the mass ratio of the first reacted liquid to the second mixed salt is (1 to 20):(1 to 5), such as 1:1, 2:1, 3:2, 5:3, 8:3, 10:4, 12:5, 14:5, 16:5, 18:5, 20:5, etc.

In an embodiment, in step (4), the stirring is performed at a rotational speed of 550 rpm to 650 rpm, such as 500 rpm, 560 rpm, 570 rpm, 580 rpm, 590 rpm, 600 rpm, 610 rpm, 620 rpm, 630 rpm, 640 rpm, 650 rpm, etc., for 0.5 hours to 5 hours, such as 0.5 hours, 1 hour, 1.5 hours, 2 hours, 2.5 hours, 3 hours, 3.5 hours, 4 hours, 4.5 hours, 5 hours, etc.

In an embodiment provided by the present disclosure, the rotational speed of the stirring is appropriately reduced so that the precipitate small particles formed in the second coprecipitation reaction process cannot cling to the surface of the inner core during growth, thereby forming a sandwich structure. Specifically, the first mixed salt, the precipitant, and the second mixed liquid are continuously added from the bottom of a reaction kettle, and the obtained second reaction material overflows into an aging kettle.

In step (5) provided by an embodiment of the present disclosure, the second reacted material to obtain a primary washed material. In this process, the stirring is performed for 0.1 hours to 5 hours, and the detergent used herein is a conventional detergent in the art, such as sodium hydroxide with a pH of 9.0. It is to be noted that those skilled in the art can choose the addition amount of the detergent and the rotational speed and time of the stirring according to actual requirements, as long as part of sodium and sulfur in the second reacted material can be removed.

In step (6) provided by an embodiment of the present disclosure, the primary washed material obtained in step (5) is subjected to a primary dehydration to obtain the primary dehydrated material, where the primary dehydration may be performed by a centrifuge, and the water content of the obtained primary dehydrated material is not higher than 10 wt %.

In step (7) provided by an embodiment of the present disclosure, the primary dehydrated material obtained in step (6) is subjected to a secondary washing and then dehydrated to obtain a secondary dehydrated material. The secondary washing is performed on the primary dehydrated material by using pure water to further remove sodium and sulfur in the dehydrated material. Those skilled in the art can choose the amount of pure water and the rotational speed and time of the stirring according to actual requirements, as long as the content of sodium and sulfur is qualified. The dehydration in this dehydration process is also performed by a centrifuge, and the water content in the obtained secondary dehydrated material is not higher than 5 wt % to 10 wt %.

In step (8) provided by an embodiment of the present disclosure, the secondary dehydrated material obtained in step (7) is dried and then sieved to remove iron to obtain the carbonate precursor having a high-nickel and low-cobalt sandwich structure. The processes of drying and sieving for iron removal are routine operations in the art, and those skilled in the art can choose according to actual requirements, which will not be described in detail herein.

In an embodiment, the present disclosure provides a method for preparing a cathode material, including:

(a) pre-firing a precursor material;
(b) mixing the pre-fired product obtained in step (a) and a lithium salt and subjecting them to a primary sintering to obtain a primary sintered material; and
(c) crushing the primary sintered material and subjecting the same to a secondary sintering to obtain a cathode material.

Wherein in step (a), the precursor material is the preceding carbonate precursor having a high-nickel and low-cobalt sandwich structure or a carbonate precursor having a high-nickel and low-cobalt sandwich structure prepared by the preceding method.

In an embodiment provided by the present disclosure, the carbonate precursor having a sandwich structure, which has advantages of narrow particle size distribution, good fluidity, and excellent electrochemical performance, is pre-fired and then subjected to a primary sintering and a secondary sintering. In this way, due to the special sandwich structure of the carbonate precursor, the precursor can achieve the complete transformation and crystallization of the high-nickel material at a relatively low temperature, and the problem that the local structure of the high-nickel material collapses in the cycle process due to the mixing of cations in the high-temperature calcination process is avoided, so that the prepared cathode material has a high specific capacity and excellent cycle performance and electrochemical performance.

In an embodiment, in step (a), the pre-firing is performed at a temperature of 400° C. to 500° C., such as 400° C., 410° C., 420° C., 430° C., 440° C., 450° C., 460° C., 470° C., 480° C., 490° C., 500° C., etc., for 2 hours to 6 hours, such as 2 hours, 3 hours, 4 hours, 5 hours, 6 hours, etc.

In an embodiment provided by the present disclosure, the pre-firing is performed under the conditions of the preceding pre-firing temperature and the pre-firing time, which can significantly improve the decomposition rate of the precursor carbonate without causing serious energy waste.

In an embodiment, in step (b), the molar ratio of the pre-fired product to the lithium salt is 1:(1.02 to 1.08), such as 1:1.02, 1:1.03, 1:1.04, 1:1.05, 1:1.06, 1:1.07, 1:1.08, etc.

In an embodiment, in step (b), the primary sintering is performed at a temperature of 700° C. to 850° C., such as 700° C., 710° C., 720° C., 730° C., 740° C., 750° C., 760° C., 770° C., 780° C., 790° C., 800° C., 810° C., 820° C., 830° C., 840° C., 850° C., etc., for 10 hours to 22 hours, such as 10 hours, 11 hours, 12 hours, 13 hours, 14 hours, 15 hours, 16 hours, 17 hours, 18 hours, 19 hours, 20 hours, 21 hours, 22 hours, etc.

In an embodiment provided by the present disclosure, the pre-fired product obtained in step (a) and a lithium salt are mixed and subjected to a primary sintering so that lithium ions migrate into the precursor material and combine to generate a lithium salt cathode material, that is, a primary sintered material. The primary sintering is performed under the conditions of the primary sintering temperature and time described in the present disclosure, which can promote the rapid migration of lithium ions into the precursor material without causing energy waste.

In an embodiment, in step (c), the secondary sintering is performed at a temperature of 580° C. to 650° C., such as 580° C., 590° C., 600° C., 610° C., 620° C., 630° C., 640° C., 650° C., etc., for 8 hours to 12 hours, such as 8 hours, 9 hours, 10 hours, 11 hours, 12 hours, etc.

In an embodiment provided by the present disclosure, the primary sintered material obtained in step (b) is crushed and then subjected to a secondary sintering so that the carbonate in the precursor is completely decomposed to obtain the cathode material. The secondary sintering is performed under the conditions of the secondary sintering temperature and time described in the present disclosure, which can ensure that the precursor material is completely sintered without causing energy waste. It should be noted that the crushing particle size of the primary sintered material may be chosen by those skilled in the art according to actual requirements, which will not be described in detail herein.

The present disclosure provides a cathode material in an embodiment. The cathode material is prepared by the method described in the preceding embodiment.

In an embodiment provided by the present disclosure, the cathode material has a high specific capacity and excellent cycle performance and electrochemical performance.

The present disclosure provides a lithium battery in an embodiment. The lithium battery includes the cathode material described in the preceding embodiment.

In an embodiment provided by the present disclosure, the lithium battery has a long cycle life on the basis of having high specific energy.

The present disclosure provides a vehicle in an embodiment. The vehicle includes the lithium battery described in the preceding embodiment.

In an embodiment provided by the present disclosure, the vehicle loaded with the lithium battery having high specific energy and long cycle life has excellent endurance, thereby meeting the use requirements of consumers.

BRIEF DESCRIPTION OF DRAWINGS

The drawings are used to provide a further understanding of the solutions of the present disclosure, constitute a part of the description, explain the solutions of the present disclosure in conjunction with the embodiments of the present application, and do not limit the solutions of the present disclosure.

DETAILED DESCRIPTION

Technical solutions of the present disclosure are further described below through specific embodiments in conjunction with the drawings.

In an embodiment, the present disclosure provides a carbonate precursor having a high-nickel and low-cobalt sandwich structure. The carbonate precursor includes an inner core and outer shell layer covering at least a part of the outer surface of the inner core, where the chemical formula of the material of the inner core is $Ni_{x1}Co_{y1}Mn_{(1-x1-y1)}CO_3$, where x1 ranges from 0.75 to 0.92 and y1 ranges from 0.01 to 0.15, and the chemical formula of the material of the outer shell layer is $Ni_{x2}Co_{y2}Mn_{(1-x2-y2)}CO_3$, where x2 ranges from 0.7 to 0.92 and y2 ranges from 0.01 to 0.15. The carbonate precursor having a sandwich structure has the advantages of narrow particle size distribution, good fluidity, and excellent electrochemical performance, and may be stably produced in both an ammonia-free system and an ammonia-containing system, especially in the ammonia-free system, that is, no ammonia-containing wastewater is produced, which is environmentally friendly. Compared with a precursor material having a solid structure, when the precursor material having a sandwich structure is sintered with lithium ions, since the outer shell layer is thin, lithium ions can more easily penetrate through the shell into the sandwich and then reach the inner core, which makes the sintering of lithium ions easier, and the same sintering effect can be achieved even if the sintering temperature is appropriately reduced. That is, the precursor having a sandwich structure can achieve the complete transformation and crystallization of the high-nickel material at a relatively low temperature, which avoids the problem that the local structure of the high-nickel material collapses in the cycle process due to the mixing of cations in the high-temperature calcination process, and the residual alkali(s) becomes less, so that the prepared cathode material has a relatively high specific capacity and excellent cycle performance and electrochemical performance. The outer shell layer has a composition with a slightly low nickel content because such a low-nickel material is more stable and less likely to react with an electrolyte and affect the battery performance. The nickel content of the inner core is slightly higher because the outer surface of the inner core is covered with the outer shell layer and thus cannot be in contact with the electrolyte. The precursor has a particle size of 8 μm to 15 μm, and due to the existence of the sandwich structure, the particle size cannot be guaranteed to be below 8 μm, and if the particle size exceeds 15 μm, the permeability effect of the sandwich may become weak or the particles are fragile because the sandwich is too thick, which degrades the quality of the precursor.

Figure 1:
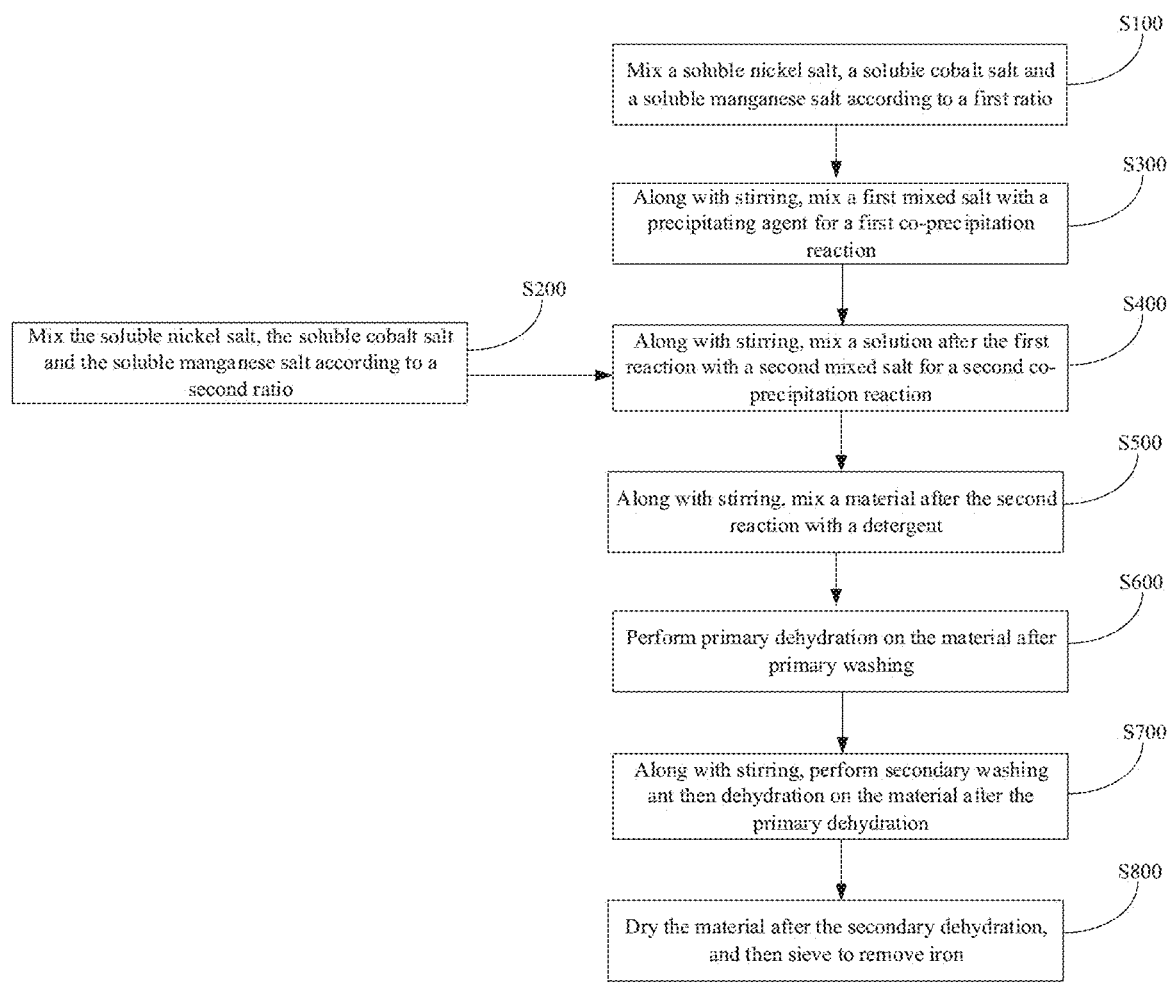
FIG. 1 is a flowchart of a method for preparing a carbonate precursor having a high-nickel and low-cobalt sandwich structure according to an embodiment of the present disclosure.

In an embodiment, the present disclosure provides a method for preparing the preceding carbonate precursor having a high-nickel and low-cobalt sandwich structure. As shown in FIG. 1, the method includes the following steps.

In S100, a soluble nickel salt, a soluble cobalt salt, and a soluble manganese salt are mixed according to a first ratio to obtain a first mixed salt. The soluble nickel salt is at least one selected from the group consisting of nickel chloride, nickel nitrate, and nickel sulfate; the soluble cobalt salt is at least one selected from the group consisting of cobalt chloride, cobalt nitrate, and cobalt sulfate; and the soluble manganese salt is at least one selected from the group consisting of manganese chloride, manganese nitrate, and manganese sulfate. The concentrations of the soluble nickel salt, the soluble cobalt salt, and the soluble manganese salt in the first mixed salt are each independently 80 g/L to 130 g/L. The first ratio is a molar ratio of nickel, cobalt to manganese of (0.75 to 0.92):(0.01 to 0.15):(0.07 to 0.24).

In S200, a soluble nickel salt, a soluble cobalt salt, and a soluble manganese salt are mixed according to a second ratio to obtain a second mixed salt. The soluble nickel salt is at least one selected from the group consisting of nickel chloride, nickel nitrate, and nickel sulfate; the soluble cobalt salt is at least one selected from the group consisting of cobalt chloride, cobalt nitrate, and cobalt sulfate; and the soluble manganese salt is at least one selected from the group consisting of manganese chloride, manganese nitrate, and manganese sulfate. The concentrations of the soluble nickel salt, the soluble cobalt salt, and the soluble manganese salt in the second mixed salt are each independently 80 g/L to 130 g/L. The second ratio is a molar ratio of nickel, cobalt to manganese of (0.7 to 0.92):(0.01 to 0.15):(0.07 to 0.29).

In S300, with stirring, the first mixed salt obtained in step S100 and a precipitant are mixed and subjected to a first coprecipitation reaction to obtain a first reacted liquid. The precipitant is at least one selected from the group consisting of sodium carbonate, sodium bicarbonate, ammonium carbonate, and ammonium bicarbonate, or includes ammonia water and at least one of the group consisting of sodium carbonate, sodium bicarbonate, ammonium carbonate, and ammonium bicarbonate, where the concentration of sodium bicarbonate is 50 g/L to 100 g/L, the concentration of sodium carbonate is 100 g/L to 200 g/L, the concentration of ammonium carbonate is 200 g/L to 500 g/L, the concentration of ammonium bicarbonate is 100 g/L to 200 g/L, and the concentration of ammonia water is 100 g/L to 200 g/L. The soluble nickel salt, the soluble cobalt salt, and the soluble manganese salt in the first mixed salt and the precipitant are coprecipitated to obtain a first reacted liquid containing nickel precipitate, cobalt precipitate, and manganese precipitate, thus obtaining an inner core having an irregular structure. The stirring in the process of the first coprecipitation reaction is performed at a rotational speed of 700 rpm to 1000 rpm and a temperature of 50° C. to 70° C. for 5 hours to 60 hours, the pH of the first reacted liquid is 8.5 to 9.5, and the mixing ratio of the first mixed salt to the precipitant needs to enable the liquid-solid content of the first reacted liquid to be 100 g/L to 300 g/L.

In S400, with stirring, the second mixed salt obtained in step S200 and the first reacted liquid obtained in step S300 are mixed and subjected to a second coprecipitation reaction, where the generated precipitates are gradually deposited and grown on the supporting points provided by the inner core having an irregular structure formed in step S300, that is, the inner core is covered with the outer shell layer, to obtain a second reacted material. The stirring in this process is performed at a rotational speed of 550 rpm to 650 rpm for 0.5 hours to 5 hours. The first mixed salt, the precipitant, and the second mixed liquid are continuously added from the bottom of a reaction kettle, the obtained second reaction material overflows into an aging kettle, and the mass ratio of the first reacted liquid to the second mixed salt is (1 to 20):(1 to 5).

In S500, with stirring, the second reacted material obtained in step S400 and a detergent are mixed to obtain a primary washed material, where the stirring is performed for 0.1 hours to 5 hours, and the detergent used herein is a conventional detergent in the art, such as sodium hydroxide with a pH of 9.0.

In S600, the primary washed material obtained in step S500 is subjected to a primary dehydration to obtain a primary dehydrated material. The primary dehydration may be performed by a centrifuge, and the water content of the obtained primary dehydrated material is not higher than 10 wt %.

In S700, the primary dehydrated material obtained in step S600 is subjected to a second washing and dehydrated to obtain a secondary dehydrated material. The secondary washing is performed on the primary dehydrated material by using pure water to further remove sodium and sulfur in the dehydrated material, where the dehydration process is performed by a centrifuge, and the water content of the obtained secondary dehydrated material is not higher than 5 wt % to 10 wt %.

In S800, the obtained secondary dehydrated material is dried and sieved to remove iron to obtain a carbonate precursor having a high-nickel and low-cobalt sandwich structure.

Figure 2:
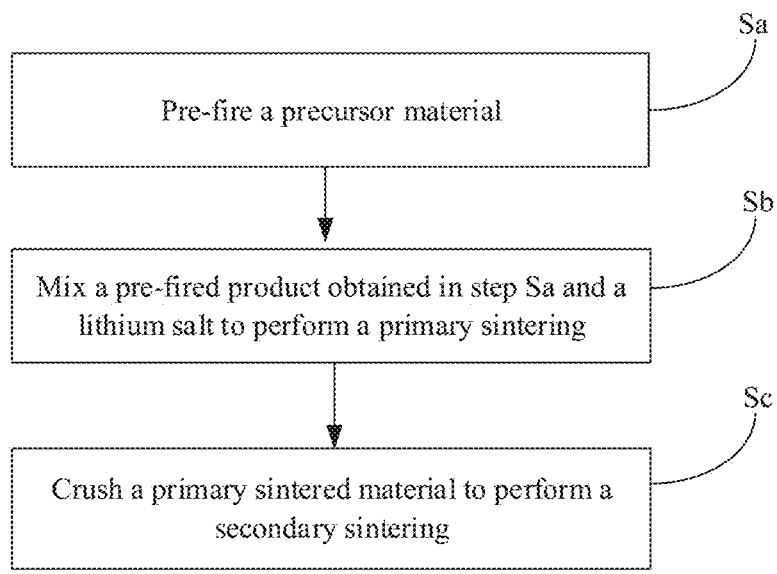
FIG. 2 is a flowchart of a method for preparing a cathode material according to an embodiment of the present disclosure.

In an embodiment, the present disclosure provides a method for preparing a cathode material. As shown in FIG. 2, the method includes the following steps.

In Sa, the carbonate precursor having a high-nickel and low-cobalt sandwich structure described in an embodiment or a carbonate precursor having a high-nickel and low-cobalt sandwich structure prepared in an embodiment is pre-fired at 400° C. to 500° C. for 2 hours to 6 hours to decompose the carbonate in the precursor.

In Sb, the pre-fired product obtained in step Sa and a lithium salt are mixed and subjected to a primary sintering so that lithium ions migrate into the precursor material and combine to generate a lithium salt cathode material, that is, a primary sintered material. The lithium salt is at least one selected from the group consisting of lithium hydroxide and lithium carbonate, the molar ratio of the precursor material to the lithium salt is 1:(1.02 to 1.08), and the primary sintering is performed at 700° C. to 850° C. for 10 hours to 22 hours.

In Sc, the primary sintered material obtained in step Sb is crushed and then subjected to a secondary sintering so that the carbonate in the precursor is completely decomposed to obtain the cathode material. The secondary sintering is performed at 580° C. to 650° C. for 8 hours to 12 hours.

In an embodiment, the present disclosure provides a cathode material. The cathode material is prepared by the method described in the preceding embodiment.

In an embodiment, the present disclosure provides a lithium battery. The lithium battery includes the cathode material described in the preceding embodiment.

In an embodiment, the present disclosure provides a vehicle. The vehicle includes the lithium battery described in the preceding embodiment.

Example 1

The method for preparing a carbonate precursor having a high-nickel and low-cobalt sandwich structure is as follows:

(1) Nickel sulfate, cobalt sulfate, and manganese sulfate were mixed according to a molar ratio of 0.88:0.05:0.07 to obtain a first mixed salt, where the concentrations of nickel sulfate, cobalt sulfate, and manganese sulfate in the first mixed salt were all 120 g/L.

(2) Nickel sulfate, cobalt sulfate, and manganese sulfate were mixed according to a molar ratio of 0.83:0.05:0.12 to obtain a second mixed salt, where the concentrations of nickel sulfate, cobalt sulfate, and manganese sulfate in the second mixed salt were all 120 g/L.

(3) With stirring, the preceding mixed solution, 100 g/L sodium bicarbonate, and 150 g/L ammonia water were mixed in a reaction kettle to perform a first coprecipitation reaction, where the stirring in the process of the first coprecipitation reaction was performed at a rotational speed of 750 rpm to 850 rpm and a temperature of 60° C. for 20 hours, and the pH of the first reacted liquid was controlled to be 8.5, and the liquid-solid content of the first reacted liquid was controlled to be 120 g/L.

(4) With stirring, the second mixed salt obtained in step (2) and the first reacted liquid obtained in step (3) were mixed to perform a second coprecipitation reaction to obtain a second reacted material, where the mass ratio of the first reacted liquid to the second mixed salt was 2:1, and the stirring in the process was performed at a rotational speed of 600 rpm for 5 hours, and the obtained second reacted material overflowed into an aging kettle.

(5) The obtained second reacted material and sodium hydroxide with a pH of 9 were mixed and stirred for 0.1 hours to obtain a primary washed material.

(6) The obtained second reacted material was dehydrated by a centrifuge to obtain a primary dehydrated material with a water content not higher than 10 wt %.

(7) The obtained primary dehydrated material was washed by using pure water and dehydrated to obtain a secondary dehydrated material with a water content not higher than 10 wt %.

(8) The obtained secondary dehydrated material was dried and sieved to remove iron to obtain a carbonate precursor having a high-nickel and low-cobalt sandwich structure with a particle size of 12 μm.

The method for preparing a cathode material is as follows:

Sa: The carbonate precursor having a high-nickel and low-cobalt sandwich structure obtained in step (8) was pre-fired at 500° C. for 4 hours.

Sb: The pre-fired product obtained in step Sa and lithium hydroxide were mixed according to a molar ratio of 1:1.06 and subjected to a primary sintering at 850° C. for 18 hours to obtain a primary sintered material.

Sc: The obtained primary sintered material was crushed and subjected to a secondary sintering at 600° C. for 12 hours to obtain a cathode material.

Figure 3:
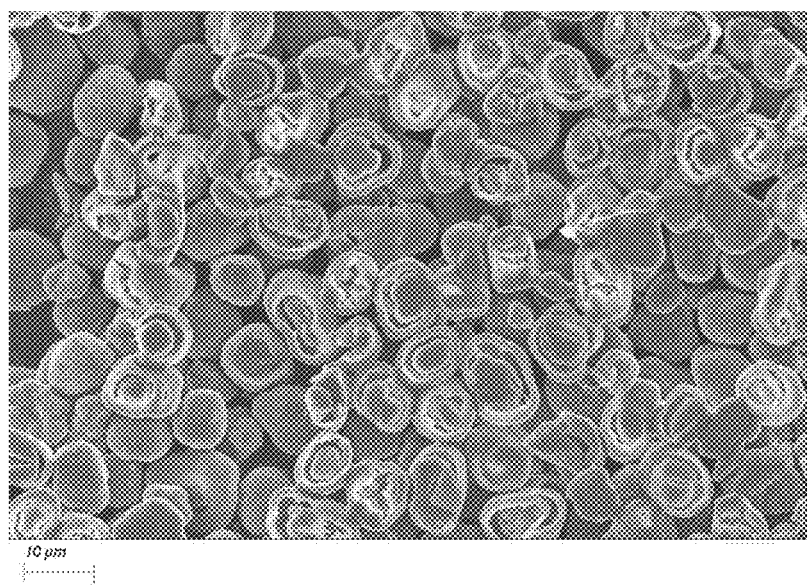
FIG. 3 is a scanning electron microscopy image of the carbonate precursor having a high-nickel and low-cobalt sandwich structure prepared in an embodiment.

FIG. 3 is a scanning electron microscopy image of a carbonate precursor having a high-nickel and low-cobalt sandwich structure prepared in an embodiment of the present disclosure. As can be seen from the image, the prepared precursor material had a core-shell sandwich structure. The particle size distribution of the precursor was detected by a laser particle size analyzer, and it is found that the particle size distribution of the precursor was uniform. Meanwhile, through detection, the content of sodium in the precursor was less than 300 ppm and the content of sulfur was less than 1000 ppm. The obtained cathode material was assembled into a button battery (by using an EC/DMC electrolyte in which the content of lithium hexafluorophosphate was 1.0 mol/L), and the electrochemical performance of the button battery was detected. The capacity per gram of the product at 0.1 C was 195 mAh to 200 mAh, and the first efficiency was 92%. There was no obvious gas generation in the soft package detection. The residual alkali(s) of the primary sintered material was detected to be 8000 ppm.

Example 2

The method for preparing a carbonate precursor having a high-nickel and low-cobalt sandwich structure is as follows:

(1) Nickel nitrate, cobalt nitrate, and manganese nitrate were mixed according to a molar ratio of 0.90:0.03:0.07 to obtain a first mixed salt, where the concentrations of nickel nitrate, cobalt nitrate, and manganese nitrate in the first mixed salt were all 110 g/L.

(2) Nickel nitrate, cobalt nitrate, and manganese nitrate were mixed according to a molar ratio of 0.83:0.03:0.14 to obtain a second mixed salt, where the concentrations of nickel nitrate, cobalt nitrate, and manganese nitrate in the second mixed salt were all 110 g/L.

(3) With stirring, the preceding mixed solution, 200 g/L sodium carbonate, and 500 g/L ammonium carbonate were mixed in a reaction kettle to perform a first coprecipitation reaction, where the stirring in the process of the first coprecipitation reaction was performed at a rotational speed of 750 rpm to 850 rpm and a temperature of 65° C. for 30 hours, and the pH of the first reacted liquid was controlled to be 9, and the liquid-solid content of the first reacted liquid was controlled to be 180 g/L.

(4) With stirring, the second mixed salt obtained in step (2) and the first reacted liquid obtained in step (3) were mixed to perform a second coprecipitation reaction to obtain a second reacted material, where the mass ratio of the first reacted liquid to the second mixed salt was 20:1, and the stirring in the process was performed at a rotational speed of 600 rpm for 5 hours, and the obtained second reacted material overflowed into an aging kettle.

(5) The obtained second reacted material and sodium hydroxide with a pH of 9 were mixed and stirred for 1 hour to obtain a primary washed material.

(6) The obtained second reacted material was dehydrated by a centrifuge to obtain a primary dehydrated material with a water content not higher than 10 wt %.

(7) The obtained primary dehydrated material was washed by using pure water and dehydrated to obtain a secondary dehydrated material with a water content not higher than 10 wt %.

(8) The obtained secondary dehydrated material was dried and sieved to remove iron to obtain a carbonate precursor having a high-nickel and low-cobalt sandwich structure with a particle size of 10 μm.

The method for preparing a cathode material is as follows:

Sa: The carbonate precursor having a high-nickel and low-cobalt sandwich structure obtained in step (8) was pre-fired at 500° C. for 4 hours.

Sb: The pre-fired product obtained in step Sa and lithium carbonate were mixed according to a molar ratio of 1:1.03 and subjected to a primary sintering at 780° C. for 22 hours to obtain a primary sintered material.

Sc: The obtained primary sintered material was crushed and subjected to a secondary sintering at 590° C. for 10 hours to obtain a cathode material.

The prepared precursor material had a core-shell sandwich structure. The particle size distribution of the precursor was detected by a laser particle size analyzer, and it is found that the particle size distribution of the precursor was uniform. Meanwhile, through detection, the content of sodium in the precursor was less than 300 ppm and the content of sulfur was less than 1000 ppm. The obtained cathode material was assembled into a button battery (by using an EC/DMC electrolyte in which the content of lithium hexafluorophosphate was 1.0 mol/L), and the electrochemical performance of the button battery was detected. The capacity per gram of the product at 0.1 C was 208 mAh to 210 mAh, and the first efficiency was 90%. There was no obvious gas generation in the soft package detection. The residual alkali(s) of the primary sintered material was detected to be 6000 ppm to 8000 ppm.

Example 3

The method for preparing a carbonate precursor having a high-nickel and low-cobalt sandwich structure is as follows:

(1) Nickel chloride, cobalt chloride, and manganese chloride were mixed according to a molar ratio of 0.92:0.01:0.07 to obtain a first mixed salt, where the concentrations of nickel chloride, cobalt chloride, and manganese chloride in the first mixed salt were all 100 g/L.

(2) Nickel chloride, cobalt chloride, and manganese chloride were mixed according to a molar ratio of 0.88:0.01:0.11 to obtain a second mixed salt, where the concentrations of nickel chloride, cobalt chloride, and manganese chloride in the second mixed salt were all 100 g/L.

(3) With stirring, the preceding mixed solution, 200 g/L sodium carbonate, and 100 g/L sodium bicarbonate were mixed in a reaction kettle to perform a first coprecipitation reaction, where the stirring in the process of the first coprecipitation reaction was performed at a rotational speed of 750 rpm and a temperature of 50° C. for 50 hours, and the pH of the first reacted liquid was controlled to be 9.5, and the liquid-solid content of the first reacted liquid was controlled to be 150 g/L.

(4) With stirring, the second mixed salt obtained in step (2) and the first reacted liquid obtained in step (3) were mixed to perform a second coprecipitation reaction to obtain a second reacted material, where the mass ratio of the first reacted liquid to the second mixed salt was 1:5, and the stirring in the process was performed at a rotational speed of 600 rpm for 5 hours, and the obtained second reacted material overflowed into an aging kettle.

(5) The obtained second reacted material and sodium hydroxide with a pH of 9 were mixed and stirred for 1 hour to obtain a primary washed material.

(6) The obtained second reacted material was dehydrated by a centrifuge to obtain a primary dehydrated material with a water content not higher than 10 wt %.

(7) The obtained primary dehydrated material was washed by using pure water and dehydrated to obtain a secondary dehydrated material with a water content not higher than 10 wt %.

(8) The obtained secondary dehydrated material was dried and sieved to remove iron to obtain a carbonate precursor having a high-nickel and low-cobalt sandwich structure with a particle size of 8 μm.

The method for preparing a cathode material is as follows:

Sa: The carbonate precursor having a high-nickel and low-cobalt sandwich structure obtained in step (8) was pre-fired at 500° C. for 4 hours.

Sb: The pre-fired product obtained in step Sa and lithium hydroxide were mixed according to a molar ratio of 1:1.05 and subjected to a primary sintering at 740° C. for 20 hours to obtain a primary sintered material.

Sc: The obtained primary sintered material was crushed and subjected to a secondary sintering at 580° C. for 10 hours to obtain a cathode material.

The prepared precursor material had a core-shell sandwich structure. The particle size distribution of the precursor was detected by a laser particle size analyzer, and it is found that the particle size distribution of the precursor was uniform. Meanwhile, through detection, the content of sodium in the precursor was less than 300 ppm and the content of sulfur was less than 1000 ppm. The obtained cathode material was assembled into a button battery (by using an EC/DMC electrolyte in which the content of lithium hexafluorophosphate was 1.0 mol/L), and the electrochemical performance of the button battery was detected. The capacity per gram of the product at 0.1 C was 205 mAh to 210 mAh, and the first efficiency was 90%. There was no obvious gas generation in the soft package detection. The residual alkali(s) of the primary sintered material was detected to be 6000 ppm to 8000 ppm.

Example 4

The method for preparing a carbonate precursor having a high-nickel and low-cobalt sandwich structure is as follows:

(1) Nickel sulfate, cobalt sulfate, and manganese sulfate were mixed according to a molar ratio of 0.75:0.15:0.1 to obtain a first mixed salt, where the concentrations of nickel sulfate, cobalt sulfate, and manganese sulfate in the first mixed salt were all 80 g/L.

(2) Nickel sulfate, cobalt sulfate, and manganese sulfate were mixed according to a molar ratio of 0.7:0.15:0.15 to obtain a second mixed salt, where the concentrations of nickel sulfate, cobalt sulfate, and manganese sulfate in the second mixed salt were all 80 g/L.

(3) With stirring, the preceding mixed solution, 100 g/L sodium bicarbonate, and 150 g/L ammonia water were mixed in a reaction kettle to perform a first coprecipitation reaction, where the stirring in the process of the first coprecipitation reaction was performed at a rotational speed of 700 rpm to 750 rpm and a temperature of 50° C. for 60 hours, and the pH of the first reacted liquid was controlled to be 8.5, and the liquid-solid content of the first reacted liquid was controlled to be 100 g/L.

(4) With stirring, the second mixed salt obtained in step (2) and the first reacted liquid obtained in step (3) were mixed to perform a second coprecipitation reaction to obtain a second reacted material, where the mass ratio of the first reacted liquid to the second mixed salt was 1:5, and the stirring in the process was performed at a rotational speed of 650 rpm for 5 hours, and the obtained second reacted material overflowed into an aging kettle.

(5) The obtained second reacted material and sodium hydroxide with a pH of 9 were mixed and stirred for 0.1 hours to obtain a primary washed material.

(6) The obtained second reacted material was dehydrated by a centrifuge to obtain a primary dehydrated material with a water content not higher than 10 wt %.

(7) The obtained primary dehydrated material was washed by using pure water and dehydrated to obtain a secondary dehydrated material with a water content not higher than 10 wt %.

(8) The obtained secondary dehydrated material was dried and sieved to remove iron to obtain a carbonate precursor having a high-nickel and low-cobalt sandwich structure with a particle size of 8 μm.

The method for preparing a cathode material is as follows:

Sa: The carbonate precursor having a high-nickel and low-cobalt sandwich structure obtained in step (8) was pre-fired at 400° C. for 6 hours.

Sb: The pre-fired product obtained in step Sa and lithium hydroxide were mixed according to a molar ratio of 1:1.02 and subjected to a primary sintering at 700° C. for 22 hours to obtain a primary sintered material.

Sc: The obtained primary sintered material was crushed and subjected to a secondary sintering at 580° C. for 12 hours to obtain a cathode material.

FIG. 3 is a scanning electron microscopy image of a carbonate precursor having a high-nickel and low-cobalt sandwich structure prepared in an embodiment of the present disclosure. As can be seen from the image, the prepared precursor material had a core-shell sandwich structure. The particle size distribution of the precursor was detected by a laser particle size analyzer, and it is found that the particle size distribution of the precursor was uniform. Meanwhile, through detection, the content of sodium in the precursor was less than 300 ppm and the content of sulfur was less than 1000 ppm. The obtained cathode material was assembled into a button battery (by using an EC/DMC electrolyte in which the content of lithium hexafluorophosphate was 1.0 mol/L), and the electrochemical performance of the button battery was detected. The capacity per gram of the product at 0.1 C was 193 mAh to 200 mAh, and the first efficiency was 91%. There was no obvious gas generation in the soft package detection. The residual alkali of the primary sintered material was detected to be 6000 ppm.

Example 5

The method for preparing a carbonate precursor having a high-nickel and low-cobalt sandwich structure is as follows:

(1) Nickel sulfate, cobalt sulfate, and manganese sulfate were mixed according to a molar ratio of 0.92:0.01:0.07 to obtain a first mixed salt, where the concentrations of nickel sulfate, cobalt sulfate, and manganese sulfate in the first mixed salt were all 130 g/L.

(2) Nickel sulfate, cobalt sulfate, and manganese sulfate were mixed according to a molar ratio of 0.92:0.01:0.07 to obtain a second mixed salt, where the concentrations of nickel sulfate, cobalt sulfate, and manganese sulfate in the second mixed salt were all 130 g/L.

(3) With stirring, the preceding mixed solution, 200 g/L ammonium carbonate, and 100 g/L ammonia water were mixed in a reaction kettle to perform a first coprecipitation reaction, where the stirring in the process of the first coprecipitation reaction was performed at a rotational speed of 950 rpm to 1000 rpm and a temperature of 70° C. for 5 hours, and the pH of the first reacted liquid was controlled to be 9.5, and the liquid-solid content of the first reacted liquid was controlled to be 300 g/L.

(4) With stirring, the second mixed salt obtained in step (2) and the first reacted liquid obtained in step (3) were mixed to perform a second coprecipitation reaction to obtain a second reacted material, where the mass ratio of the first reacted liquid to the second mixed salt was 20:1, and the stirring in the process was performed at a rotational speed of 900 rpm for 0.5 hours, and the obtained second reacted material overflowed into an aging kettle.

(5) The obtained second reacted material and sodium hydroxide with a pH of 9 were mixed and stirred for 5 hours to obtain a primary washed material.

(6) The obtained second reacted material was dehydrated by a centrifuge to obtain a primary dehydrated material with a water content not higher than 10 wt %.

(7) The obtained primary dehydrated material was washed by using pure water and dehydrated to obtain a secondary dehydrated material with a water content not higher than 10 wt %.

(8) The obtained secondary dehydrated material was dried and sieved to remove iron to obtain a carbonate precursor having a high-nickel and low-cobalt sandwich structure with a particle size of 7 μm.

The method for preparing a cathode material is as follows:

Sa: The carbonate precursor having a high-nickel and low-cobalt sandwich structure obtained in step (8) was pre-fired at 500° C. for 4 hours.

Sb: The pre-fired product obtained in step Sa and lithium hydroxide were mixed according to a molar ratio of 1:1.08 and subjected to a primary sintering at 850° C. for 10 hours to obtain a primary sintered material.

Sc: The obtained primary sintered material was crushed and subjected to a secondary sintering at 650° C. for 8 hours to obtain a cathode material.

FIG. 3 is a scanning electron microscopy image of a carbonate precursor having a high-nickel and low-cobalt sandwich structure prepared in an embodiment of the present disclosure. As can be seen from the image, the prepared precursor material had a core-shell sandwich structure. The particle size distribution of the precursor was detected by a laser particle size analyzer, and it is found that the particle size distribution of the precursor was uniform. Meanwhile, through detection, the content of sodium in the precursor was less than 300 ppm and the content of sulfur was less than 1000 ppm. The obtained cathode material was assembled into a button battery (by using an EC/DMC electrolyte in which the content of lithium hexafluorophosphate was 1.0 mol/L), and the electrochemical performance of the button battery was detected. The capacity per gram of the product at 0.1 C was 205 mAh to 215 mAh, and the first efficiency was 88%. There was no obvious gas generation in the soft package detection. The residual alkali of the primary sintered material was detected to be 9000 ppm.

What is claimed is:

1. A method for preparing a carbonate precursor having a high-nickel and low-cobalt sandwich structure, comprising:
   (1) mixing a soluble nickel salt, a soluble cobalt salt, and a soluble manganese salt according to a first ratio to obtain a first mixed salt;
   (2) mixing a soluble nickel salt, a soluble cobalt salt, and a soluble manganese salt according to a second ratio to obtain a second mixed salt;
   (3) with stirring, mixing the first mixed salt and a precipitant and subjecting them to a first coprecipitation reaction to obtain a first reacted liquid;
   (4) with stirring, mixing the first reacted liquid and the second mixed salt and subjecting them to a second coprecipitation reaction to obtain a second reacted material;
   (5) with stirring, mixing the second reacted material and a detergent to obtain a primary washed material;
   (6) subjecting the primary washed material to a primary dehydration to obtain a primary dehydrated material;
   (7) with stirring, subjecting the primary dehydrated material to a second washing and then dehydration to obtain a secondary dehydrated material; and
   (8) drying and sieving the secondary dehydrated material to remove iron to obtain a carbonate precursor having a high-nickel and low-cobalt sandwich structure;
   wherein the carbonate precursor having a high-nickel and low-cobalt sandwich structure comprises:
   an inner core, wherein a chemical formula of a material of the inner core is $Ni_{x1}Co_{y1}Mn_{(1-x1-y1)}CO_3$, wherein x1 ranges from 0.75 to 0.92, and y1 ranges from 0.01 to 0.15; and
   an outer shell layer, wherein the outer shell layer covers at least a part of an outer surface of the inner core, and a chemical formula of a material of the outer shell layer is $Ni_{x2}Co_{y2}Mn_{(1-x2-y2)}CO_3$, wherein x2 ranges from 0.7 to 0.92, and y2 ranges from 0.01 to 0.15.

2. The method according to claim 1, wherein, in step (1), the first ratio is a molar ratio of nickel, cobalt to manganese of (0.75 to 0.92):(0.01 to 0.15):(0.07 to 0.24).

3. The method according to claim 1, wherein, in step (1), concentrations of the soluble nickel salt, the soluble cobalt salt, and the soluble manganese salt in the first mixed salt are each independently 80 g/L to 130 g/L.

4. The method according to claim 1, wherein, in step (2), the second ratio is a molar ratio of nickel, cobalt to manganese of (0.7 to 0.92):(0.01 to 0.15):(0.07 to 0.29).

5. The method according to claim 1, wherein, in step (2), concentrations of the soluble nickel salt, the soluble cobalt salt, and the soluble manganese salt in the second mixed salt are each independently 80 g/L to 130 g/L.

6. The method according to claim 1, wherein, in steps (1) and (2), the soluble nickel salt is independently selected from at least one the group consisting of nickel chloride, nickel nitrate, and nickel sulfate.

7. The method according to claim 1, wherein, in steps (1) and (2), the soluble cobalt salt is independently selected from at least one the group consisting of cobalt chloride, cobalt nitrate, and cobalt sulfate.

8. The method according to claim 1, wherein, in steps (1) and (2), the soluble manganese salt is independently selected from at least one the group consisting of manganese chloride, manganese nitrate, and manganese sulfate.

9. The method according to claim 1, wherein, in step (3), the precipitant is at least one selected from the group consisting of sodium carbonate, sodium bicarbonate, ammonium carbonate, and ammonium bicarbonate.

10. The method according to claim 9, wherein the precipitant further comprises ammonia water.

11. The method according to claim 9, wherein a concentration of sodium carbonate is 100 g/L to 200 g/L;
- a concentration of sodium bicarbonate is 50 g/L to 100 g/L;
- a concentration of ammonium carbonate is 200 g/L to 500 g/L; and
- a concentration of ammonium bicarbonate is 100 g/L to 200 g/L.

12. The method according to claim 1, wherein, in step (4), the mass ratio of the first reacted liquid to the second mixed salt is (1 to 20):(1 to 5).

* * * * *